United States Patent [19]
Damer

[11] Patent Number: 5,481,392
[45] Date of Patent: Jan. 2, 1996

[54] AXIAL MIRROR SCANNER SYSTEM AND METHOD

[75] Inventor: Lewis S. Damer, St. Paul, Minn.

[73] Assignee: Minnesota Mining and Manufacturing Company, St. Paul, Minn.

[21] Appl. No.: 170,590

[22] Filed: Dec. 21, 1993

[51] Int. Cl.$^6$ .................................................. G02B 26/08
[52] U.S. Cl. ..................... 359/210; 359/204; 359/209; 359/221
[58] Field of Search ........................ 250/234, 235, 250/236; 359/211, 221, 196, 840, 209, 210, 212, 214, 215–217, 219, 204, 900

[56] References Cited

U.S. PATENT DOCUMENTS

| | | | |
|---|---|---|---|
| 3,443,110 | 5/1969 | Kelsall | 250/236 |
| 4,717,224 | 1/1988 | Diehl et al. | 359/211 |
| 4,796,963 | 1/1989 | Yoshimura | 359/206 |
| 4,870,274 | 9/1989 | Hebert et al. | 250/236 |
| 5,367,399 | 11/1994 | Kramer | 359/221 |

*Primary Examiner*—Paul M. Dzierzynski
*Assistant Examiner*—James Phan
*Attorney, Agent, or Firm*—Patterson & Keough

[57] ABSTRACT

A high speed rotating optical scanning system uses a mirror within an optically transparent cylinder. A plane of the mirror passes through the axis of rotation of the cylinder. The cylinder and mirror minimize wind resistance and simplify scanner optics.

21 Claims, 4 Drawing Sheets

AXIAL MIRROR SCANNER SYSTEM AND METHOD

FIELD OF THE INVENTION

The present invention relates generally to an optical scanning device and more particularly to a high speed revolving cylindrical optical scanning device.

BACKGROUND OF THE INVENTION

Optical scanner systems are known and are in common use. These systems are critical components in such devices as bar code scanners, laser printers, and facsimile machines.

Optical scanner systems use a scanning mechanism which changes the optical path of a light beam incident to a moving mirror to create a scanning light beam. One method of creating a scanning light beam is to use a wobble mirror apparatus. A flat mirror mounted on an axle is connected to a galvanometer drive and wobbled back and forth to achieve the scanning effect by reflection of a light beam incident to the mirror. A sign wave input to the galvanometer drive is used to achieve the wobbling of the mirror. The upper normal scan speed limit is about 2,000 scans per minute. Commercial units have been produced that will scan at 1,000 scans per second, and these units conceivably can go as fast as 2,000 scans per second but the life of the unit is significantly reduced at these speeds.

U.S. Pat. No. 4,796,963 issued to Yoshimura discloses an apparatus using a flattened rotary polygonal facet mirror. This apparatus is capable of higher scan rates than the wobble mirror apparatus because the polygonal mirror is spun instead of wobbled.

U.S. Pat. No. 4,717,224 issued to Diehl and Kirsche discloses another scanning device. This device uses a rotating flat mirror which is tilted at an angle from 0.2° to 2° from a line perpendicular to the axis of rotation. The slanted mirror is mounted between two cylinders wedged end to end to hold the mirror on its slant. This apparatus is severely limited to allowing only a single input beam or source incident beam aligned along the axis of rotation of the cylinder-mirror complex. The beam is then reflected back in a cone-like fashion out the end of the cylinder. To be useful, complex post-reflection optics must be employed.

SUMMARY OF THE INVENTION

The present invention discloses a rotating optical mirror scanner system comprising at least one source of radiant energy, input imaging means for pre-focusing the radiant energy into at least one input beam, and rotating mirror means for reflectively changing the direction of the input beam. The mirror means comprises a cylinder constructed of material optically transparent to the input beam and having a mirrored surface located so that a plane of the mirrored surface divides the cylinder along the axis of rotation. Output imaging means for focusing at least one reflected input beam into at least one output scanning beam is also provided.

The invention also includes a high speed rotating mirror component of an optical scanning system comprising a cylindrical post having a first portion comprising optically transparent material and smooth outer circular surfaces configured for minimizing wind resistance during rotation about an axis of the cylindrical post which is coaxial to the cylinder curved surface. An optically reflective planar surface is configured along a diameter of the cylindrical post and extends through the axis of rotation of the cylindrical post.

The invention also includes a method of improving the scan rate of a high speed rotating optically reflective mirror scanner system. The method comprises the steps of enclosing an optically reflective mirror in an optically transparent rotatable cylinder so that a plane of the mirror passes parallel to and through the rotational axis of the optically transparent cylinder, rotating the cylinder, and positioning an energy beam to reflect from a well defined origin centered on the axis of rotation of the optically reflective mirror.

DETAILED DESCRIPTION OF THE PREFERRED EMBODIMENT

Figure 2:
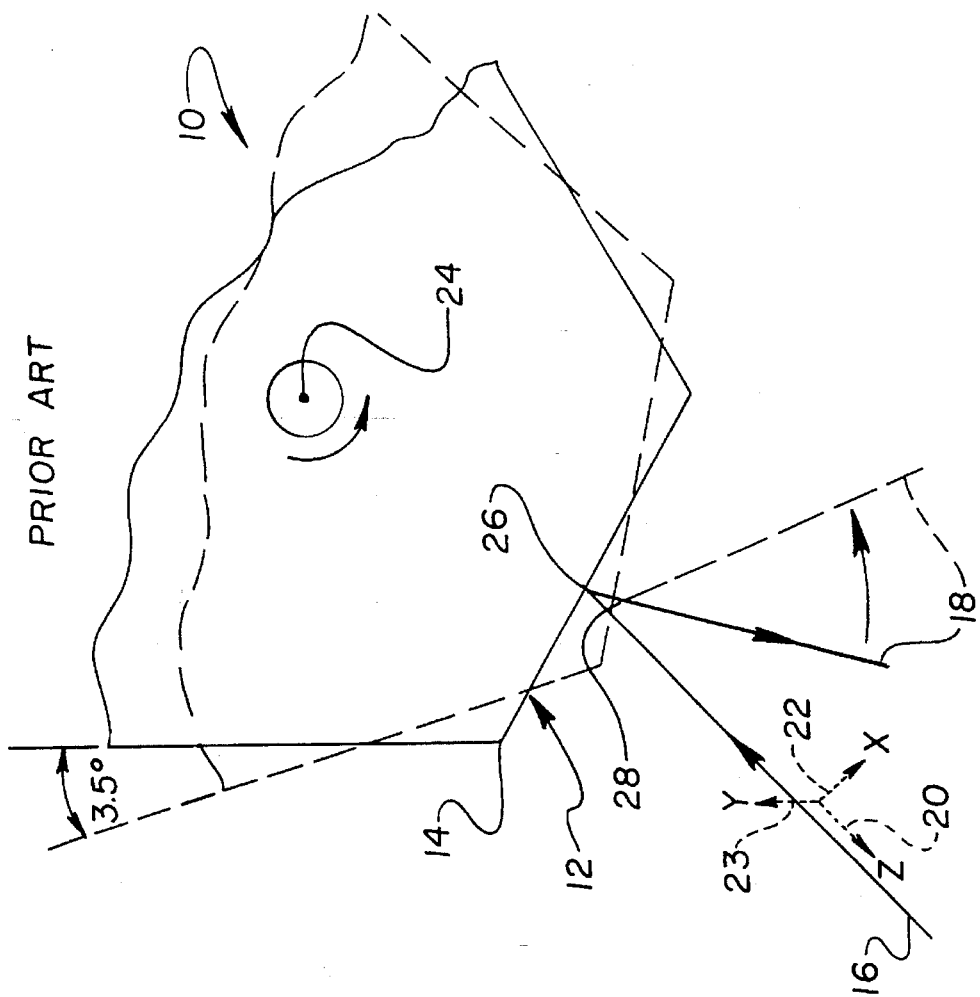
FIG. 2 is a plan view of a portion of a polygonal mirror optical scanner shown in two rotational positions.
Figure 1:
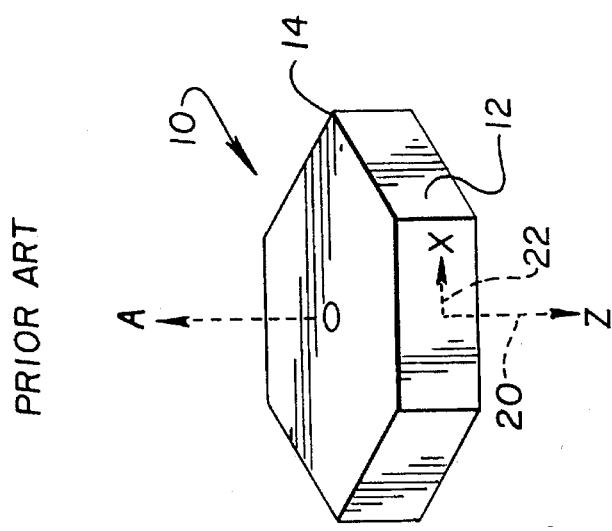
FIG. 1 is a perspective view of a conventional polygonal mirror optical scanner.

FIGS. 1 and 2 schematically represent a mirror component of existing facet polygon scanning systems. FIG. 1 depicts a portion of a hexagonal cylinder 10 having six reflective surface facets 12. The juncture of each facet 12 creates a vertex 14. When hexagonal cylinder 10 experiences high speed axial rotation about axis A—A, the vertices cause system performance problems relating to wind resistance, turbulence, and vibration.

FIG. 2 is an enlarged view of a portion of the hexagonal cylinder 10 of FIG. 1. FIG. 2 discloses an input beam 16 which is incident upon a facet face 12. Reflection of input beam 16 from facet face 12 creates an output beam 18 that will have a corresponding image plane at a specific location, but which is not shown. Input beam 16 has a coordinate orientation comprising a z axis 20, which is also the optical axis of input beam 16 and output beam 18; an x axis 22 perpendicular to z axis 20; and a y axis 23, perpendicular to both x axis 22 and z axis 20, and shown projecting out of the plane of the FIG. in an orientation equivalent to axis of rotation 24. With rotation of hexagonal cylinder 10, a point of incidence 26 of input beam 16 near the center of facet face 12 changes, for example, to a point of incidence 28 nearer the edge of facet face 12 as the facet face rotates past input beam 16. This movement of the point of incidence results in movement of the scan origin along z axis 20 the equivalent of the distance between points of incidence 26 and 28 along the optical axis. A beam portion incident to the center of a facet face must travel farther to the image plane than a beam portion which is incident to either side of the facet center. This movement of the origin along z axis 20 creates a focal distance discrepancy at the image plane. Correction for this z to z displacement can be very complex and limiting, depending upon the scanner application.

Movement of the point of incidence, or scan origin, also creates a variable speed change in the sweeping motion of output beam 18. As the incidence point of input beam 16 approaches the center of facet face 12, the scan origin moves closer to rotational axis 24. This shortening of the distance or radius of curvature translates into a slowing of the rate of change of movement of output beam 18 at the image plane. The rate of change of the movement at the image plane is slowest at the facet midpoint and accelerates as the scan origin moves out from the rotational axis. This variability in scan velocity requires additional means of correction when velocity of beam scan is important to an application using a rotating polygonal facet mirror.

Figure 3:
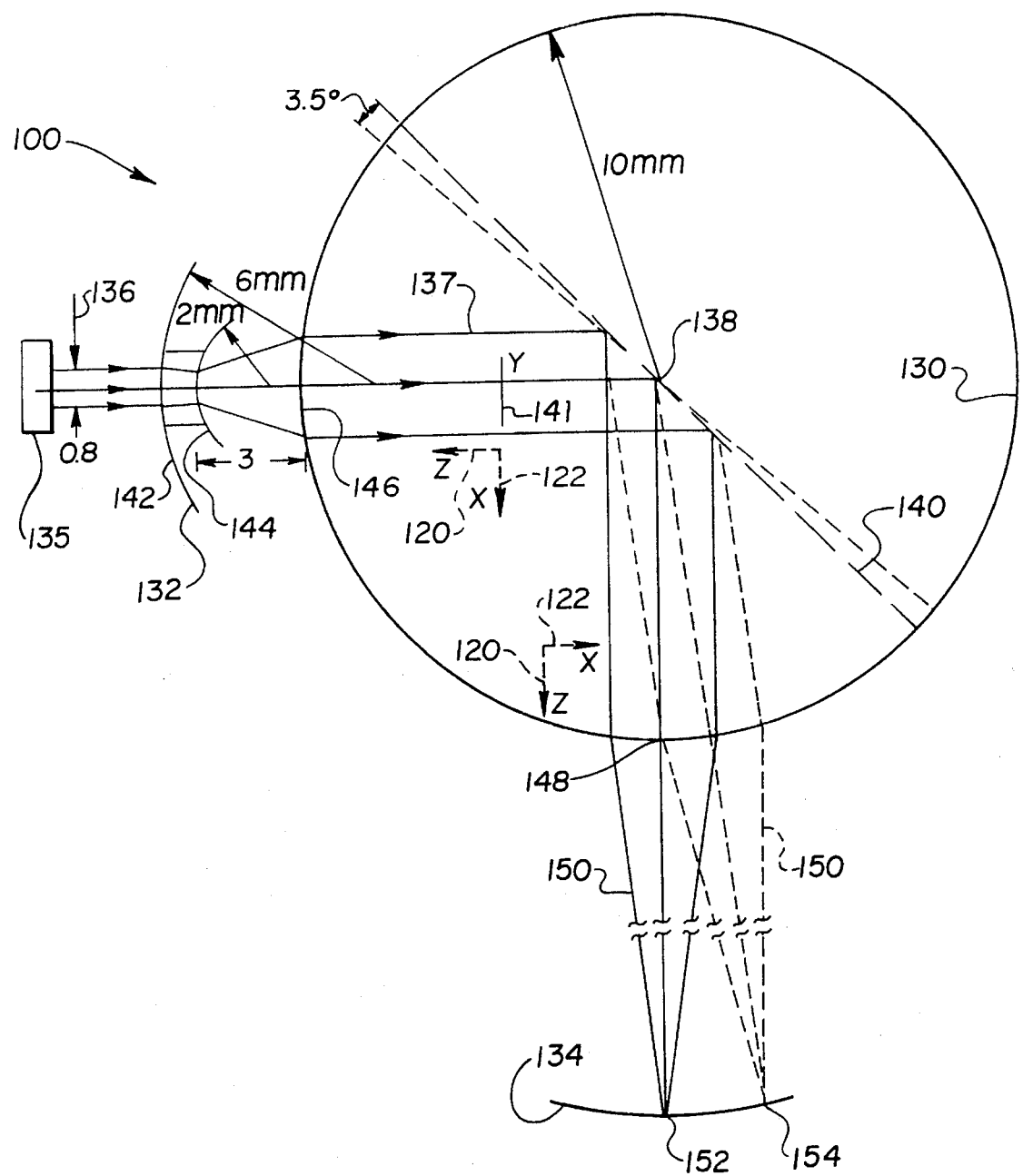
FIG. 3 is a schematic plan view of one embodiment of the axial mirror system.

One embodiment of the present invention is depicted as scanning system 100 in FIG. 3. This embodiment uses an optically transparent solid cylinder 130, shown in plan view, and an optical coordinate system having a z axis 120, an x axis 122, and a y axis 141 perpendicular to x and z and projecting out of the plane of the FIG. The y axis 141 is parallel to a rotational axis 138 of cylinder 130. Many different suitable materials exist to manufacture cylinder 130, including, for example, fused quartz. However for the depiction of FIG. 3, a transparent cylinder is disclosed with a material composition suitable for providing a refractive index of 1.5. The embodiment also uses input imaging means comprising a single convexo-concave input lens 132 to diverge radiant energy derived from at least one laser source 135 and formed as input beam 136 so that the focal point of the beam will fall beyond cylinder 130. A suitable material can be used from which to construct cylinder 130 that would not require any outside refractive power, but an input lens 132 is useful to compensate at least for the spherical aberration lens characteristics of cylinder 130. Various lens materials are suitable to form input lens 132, as well as many shapes provided that the shape is negative in optical power, such as concavo-plane, concavo-concave or plano-concave. In this depiction, a lens material having a refractive index of 2.0 was chosen.

Input beam 136 may be formed from a number of different radiant energy sources, such as visible light lasers, which are not shown in this FIG. Input beam 136 in this embodiment is coherent radiant energy, depicted in schematic form. A preferable radiant energy source is from a helium-neon laser. Input beam 136 and input lens 132 are stationary and aligned. This ensures that z axis 120 of input beam 136, the optical axis of input lens 132 and rotational axis 138 of cylinder 130 intersect. The plane of mirror 140 passes through rotational axis 138 in the y axis 141 direction. Input beam 136 is symmetrically centered about z axis 120 in the direction of x axis 122 and is also aligned to be symmetrical in x axis 122 direction about rotational axis 138 of mirror 140. The symmetry about x axis 122 eliminates z to z path length discrepancies for light travelling off center to either side of z axis 120 as cylinder 130 rotates.

Optical refraction of input beam 136 occurs at surfaces 142 and 144 of input lens 132, and surface 146 of cylinder 130 to form refracted input beam 137. Refracted input beam 137 is then reflected from the surface of mirror 140 and exits cylinder 130 at portion 148 as output scanning beam 150. Cylinder surface 148 is identical in shape to surface 146 but by convention, surface 148 carries a negative radius value due to its orientation to z axis 120 and the direction of propagation of output scanning beam 150. The summation of these refractive qualities, in conjunction with reflection at mirror surface 140, generates an output scanning beam 150 that comes to a focus 152 at image plane 134 which in this embodiment, is about 20 cm away from cylinder 130. As cylinder 130 with mirror 140 rotates, output scanning beam 150 translates along image plane 134 as a moving focused point of light in an arc about rotational axis 138 of cylinder 130. As shown in FIG. 3, after 3.5° of cylinder 130 rotation, output scanning beam 150 now focuses through point 154. The focal point of output scanning beam 150 moves at a constant velocity along image plane 134.

If mirror 140 is constructed so that it is mirrored on both sides (reflective surfaces oriented in opposite directions), a single input beam 136 produces an output scanning beam 150 in a 360° arc at the distance of image plane 134 about rotational axis 138. With a double sided mirror a single revolution of cylinder 130 will produce two scans.

Figure 4:
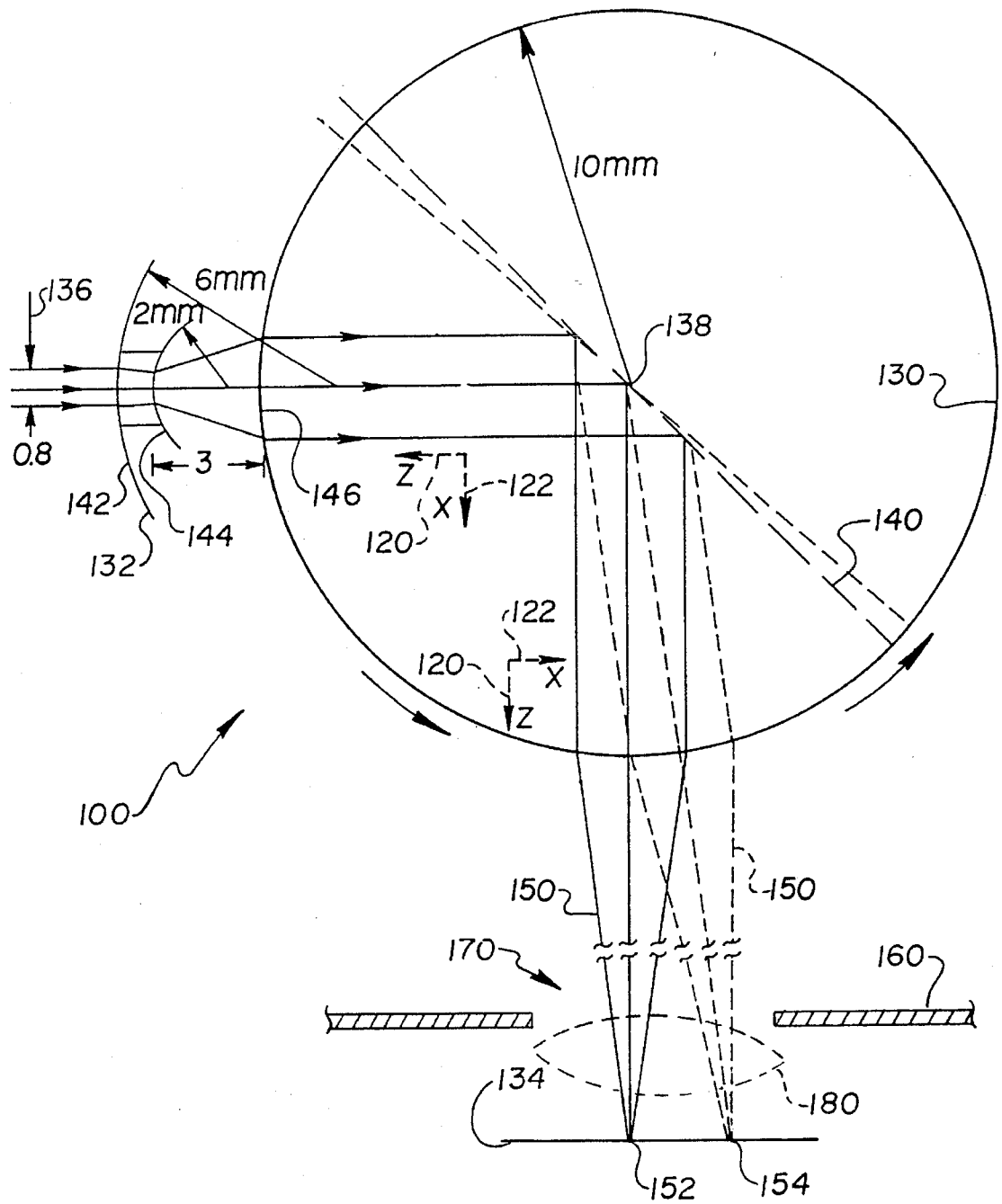
FIG. 4 is a schematic plan view of another embodiment of the axial mirror system.

Many applications use a scanning beam in a limited orientation or direction from the scan unit. As shown in FIG. 4, mask 160 is used in system 100 to limit output scanning beam 150 to those degrees of arc defined by an opening 170 within a portion of mask 160. For such applications with a single input beam 136 and double mirrors 140, each revolution of cylinder 130 will generate two scan lines focusing at image plane 134. Image plane 134 is flat due to use of a suitably shaped output lens 180 appropriately positioned proximate opening 170.

Figure 5:
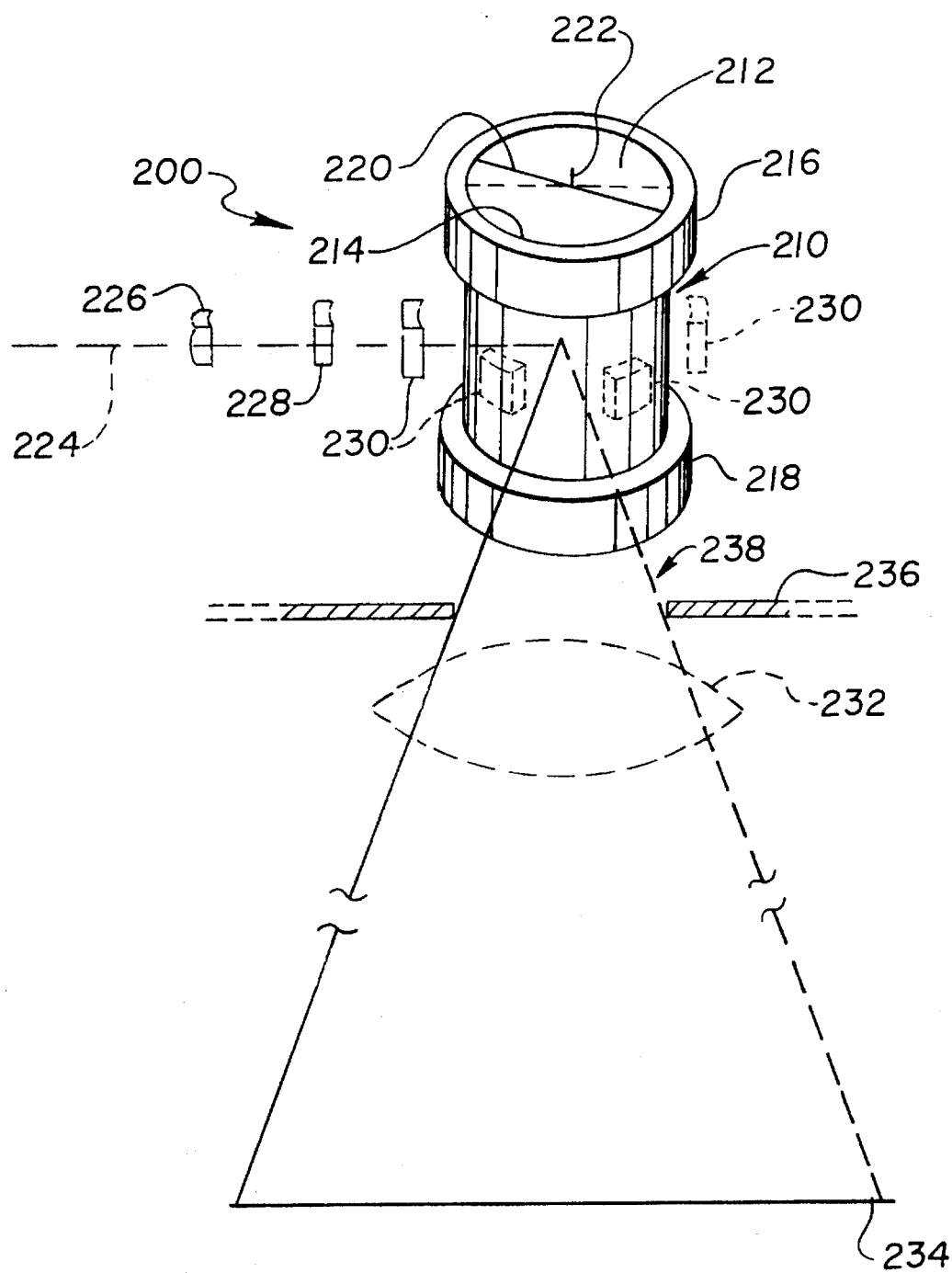
FIG. 5 is a schematic perspective view of another embodiment of the axial mirror system.

FIG. 5 discloses system 200, which is another embodiment of the present invention. Cylinder 210 is preferably constructed from two fused quartz crystal half cylinders 212 and 214. Half cylinders 212 and 214 have optical clarity. Fused quartz crystal has a refractive index of 1.45674. Before assembly, the planar surfaces of half cylinders 212 and 214 are specularly coated, for example with aluminum, to create reflective surfaces. Half cylinders 212 and 214 are then placed back to back and appropriately secured for high speed rotation. In this embodiment the connection is accomplished by a plurality of rings, such as retainer rings 216 and 218. As shown, cylinder 210 has a double sided mirror 220 dividing the cylinder in half with a plane of double sided mirror 220 passing through a rotational axis 222 of cylinder 210, which is also designated as the y axis. Cylinder 210 is 2 cm high and 2 cm in diameter. Retainer rings 216 and 218 are 0.25 cm in width.

Cylinder 210 is rotatable at velocities of up to 1,469 revolutions per second. This creates 482,631,328.3 Pascals or Newtons per square meter ($N/m^2$) (i.e., 70,000 pounds per square inch) in the fused quartz crystal, which is the maximum stress that this material can normally tolerate. The surface deflection of each half cylinder due to bending is 0.00352 mm which is considered optically acceptable. With only one input beam and using a double sided mirror, system 200 provides a maximum scan rate of 2,938 scans per second. Using a safety margin of 67% of maximum, cylinder 210 may rotate at a speed of 1,200 revolutions per second producing 2,400 output scans per second for a single input beam.

Smaller cylinders may spin at higher rates than larger cylinders. Also, materials other than fused quartz may achieve the desired strength and index of refraction required for a given application.

Referring again to FIG. 5, input beam 224 may be formed from a number of different radiant energy sources, such as visible light lasers, which are not shown in this FIG. Input beam lenses 226 and 228 correct for focus in the y axis. Input beam lens 230 is dense flint in composition with a refractive index of 1.879 and corrects for spherical aberration as well as cooperating with the optical nature of cylinder 210 to provide a focused beam at the appropriate image plane 234 distance from cylinder 210. Input beam lens 230 (or each of a plurality of lenses 230) is convexo-concave with the convex surface having a radius of 6 cm and the inner concave surface a radius of 2 cm. Input beam lens 230 is 1 mm thick at its optical axis center and the minor curve surface is 3 mm from the surface of cylinder 210. The focal length of system 200 is 30 cm from the surface of cylinder 210. System 200 also employs an output scanning beam lens 232 to flatten image plane 234.

System 200 functions well with six input beam 224 sources and six sets input beam lenses 226, 228 and 230 around the circumference of cylinder 210, although this number of sets should not be limiting of this embodiment. Spinning at 1,200 revolutions per second, cylinder 210 with double sided mirror 220 provides 14,400 scanning output beams per second in a 360° arc around the cylinder. Each output scanning beam would only be useful when not obstructed by one of the six input beam sources 224. A mask 236 with a portion defining an opening 238 will limit all output to just one direction. Opening 238 can be of any size useful to the application. The embodiment of FIG. 5 is of a size sufficient to allow a scan line length of 21.59 cm (i.e., 8½ inches) focused at image plane 234 as depicted. Configuring the system to provide an output beam dot size of 0.084 mm, a substrate such as a piece of paper 21.59 cm by 27.94 cm (i.e., 8½ by 11 inches) is scanned 0.084 mm per scan line in 0.23 seconds. A beam dot size of 0.084 mm is at an equivalent resolution of 300 dots per inch (dpi) (i.e., 300 dots per 2.54 cm), the standard resolution of present day laser printers.

An alternative application using multiple input beams is to stack the beams on top of each other displaced in the y axis direction. Depending upon the application, the output at each level in the y axis can be independently controlled, e.g. turned on and off.

Using any number of input and output imaging lens subsystems the above invention permits advanced applicability in high speed high resolution scanning. Additionally, an apparatus may use an additional input lens which will disperse an input beam along the y axis. Cylinder 210 is not curved in the y axis and has no optical power in the y axis. Therefore, such a scan beam emerges as a fan of radiant energy focused at image plane 234 as a thin line in the y axis direction. Rotation of cylinder 210 results in a scanning line which is oriented in the y axis and which is scanning in the x axis about rotational axis 222 of cylinder 210.

The present invention permits numerous combinations of input and output imaging subsystems arranged in the x axis and y axis directions. A preferred apparatus and method for a high speed optical scanner uses a rotating mirror positioned so that the axis of rotation is on, but perpendicular, to the center of the optical axis. The system and method uses an optically transparent cylinder within which to house the mirror. One advantage is elimination of windage resistance by use of an optically smooth-surfaced cylinder. Windage resistance is created by an uneven surface and limits the upper end of rotational speeds, requires more power to drive at any given speed, and creates turbulence and vibration detrimental to the optical clarity of a system.

An optically smooth-surfaced cylinder creates negligible windage resistance allowing for far greater rotational speeds achieving faster scan rates. Power consumption is thus kept to a minimum. The need to place a system within a costly and bulky vacuum apparatus is eliminated. Consequently, upper rotational speed limits in atmosphere become limited solely on the basis of the mechanical strength of the material used to make the cylinder rather than the windage resistance.

Another advantage in using a cylinder is improved optics. This advantage is actually two fold. The first is found in using a cylinder with a surface of optical quality. In this way the cylinder itself becomes a lens component within the scanning system thus simplifying the need for input optics. In the simpler applications of the present invention, the optical nature of the cylinder eliminates the need for post scanner optics. The second optical advantage is that a cylinder allows for the use of a mirror oriented with the plane of the mirror passing through the axis of rotation of the cylinder. An axially placed mirror allows the input beam to be symmetric about the axis of rotation. This symmetry of reflection provides a stationery origin point for the scan beam and eliminates the need for complex post scanner optical correction to account for origin movement.

I claim:

1. A rotating optical mirror scanner comprising:

at least one source of radiant energy;

input imaging means for pro-focusing the radiant energy into at least one input beam;

rotating mirror means for reflectively changing the direction of the input beam, the mirror means comprising a cylinder comprising material optically transparent to the input beam, and a mirrored surface located so that a plane of the mirrored surface divides the cylinder along the axis of rotation; and output imaging means comprising a lens integrally formed as an outer surface of the cylinder material for focusing at least one reflected input beam into at least one out-put scanning beam.

2. The system of claim 1 in which the cylinder comprises two equal half cylinders each having one mirrored planar surface in a plane which divides the cylinder along the axis of rotation so that when the two half cylinders are connected the cylinder comprises two mirrored surfaces oriented in opposite directions.

3. The system of claim 1 in which the rotating mirror means creates a 360 degree output beam scan.

4. The system of claim 1 in which the output imaging means comprises an external lens subsystem.

5. The system of claim 1 in which the source of radiant energy comprises a helium-neon laser.

6. The system of claim 1 in which the input imaging means further comprises lens means for pre-focusing the radiant energy to remove spherical aberration, and to limit Y-axis displacement.

7. The system of claim 1 in which the input imaging means further comprises a lens subsystem to pre-focus the radiant energy to remove spherical aberration, and to focus the radiant energy along the y axis.

8. The system of claim 1 in which the input imaging means further comprises a plurality of input imaging lenses for increasing the number of output scanning beams.

9. The system of claim 8 in which the plurality of input imaging lenses are positioned around the circumference of the cylinder.

10. The system of claim 8 in which the plurality of input imaging lenses are positioned along the y axis.

11. The system of claim 8 in which the source of radiant energy comprises a plurality of sources matched equally in number to the number of input imaging lenses.

12. The system of claim 1 in which the output imaging means comprises a plurality of output imaging lenses positioned around the circumference of the cylinder to increase the number of output scanning beams.

13. The system of claim 12 in which the number of output scanning beams is greater than 12,000 per second.

14. The system of claim 1 in which the output imaging means comprises a plurality of output imaging lenses positioned parallel to the rotation axis of the cylinder to increase the number of output scanning beams.

15. The system of claim 1 in which the rotating mirror means comprises two mirrored surfaces so that for each input imaging means two scanning output beams will be created for each rotation of the rotating mirror means.

16. The system of claim 1 in which the input imaging means centers the input beam on the axis of rotation of the rotating mirror means.

17. The system of claim 1 which creates a constant velocity moving focal point of an output scanning beam on an image plane.

18. The system of claim 1 in which the cylinder rotates at velocities greater than 1000 revolutions per second and produces greater than 2000 output scans per second for a single input beam.

19. The system of claim 1 in which the input imaging means positions each input beam symmetrically about the axis of rotation.

20. A method of improving the scan rate while maintaining constant focal point velocity of a high speed rotating optically reflective mirror scanner system comprising the steps of:

providing an optical transparent high speed capable rotatable cylinder having a rotational axis suitable for receiving an optical reflective mirror and, an output imaging lens integrally formed as an outer surface of the cylinder;

positioning an optical reflective mirror within the cylinder so that a plane of the mirror passes parallel to and through the rotational axis of the optically transparent cylinder; and rotating the cylinder and the mirror relative to an energy source so that an energy beam from the source reflects from a well-defined origin centered on the axis of rotation of the optically reflective mirror and passes through the output imaging lens which focuses the beam to a moving focal point on an imaging plane.

21. The method of claim 20 further comprising the step of enclosing a second mirror placed back to back with the initial mirror.

* * * * *